W. A. HOGE.
FISH SCREEN.
APPLICATION FILED OCT. 5, 1915.

1,195,988.

Patented Aug. 29, 1916.

WITNESSES
Guy M. Spring
Ross H. Woodward

INVENTOR
William A. Hoge
BY Richard B. Owen
ATTORNEY

UNITED STATES PATENT OFFICE.

WILLIAM A. HOGE, OF HILLSIDE, COLORADO, ASSIGNOR OF ONE-THIRD TO G. H. ALBERTS, OF PUEBLO, COLORADO.

FISH-SCREEN.

1,195,988.      Specification of Letters Patent.      Patented Aug. 29, 1916.

Application filed October 5, 1915. Serial No. 54,192.

*To all whom it may concern:*

Be it known that I, WILLIAM A. HOGE, a citizen of the United States, residing at Hillside, in the county of Fremont and State of Colorado, have invented certain new and useful Improvements in Fish-Screens, of which the following is a specification.

This invention relates to an improved fish screen which is intended to be used in connection with an irrigation ditch so that fish will be prevented from passing through the ditch, this being accomplished by means of a screen drum rotatably mounted in the ditch.

Another object of the invention is to so construct the drum that the screening forming a part thereof will be held tight, the spoke element for holding the screening in spaced relation to the shaft being formed of resilient material such as heavy wire.

Another object of the invention is to provide a screening which will be very effective in operation but at the same time will be very simple in construction and formed of a comparatively few number of parts not liable to easily get out of order or break.

This invention is illustrated in the accompanying drawings, wherein:—

Figure 1:
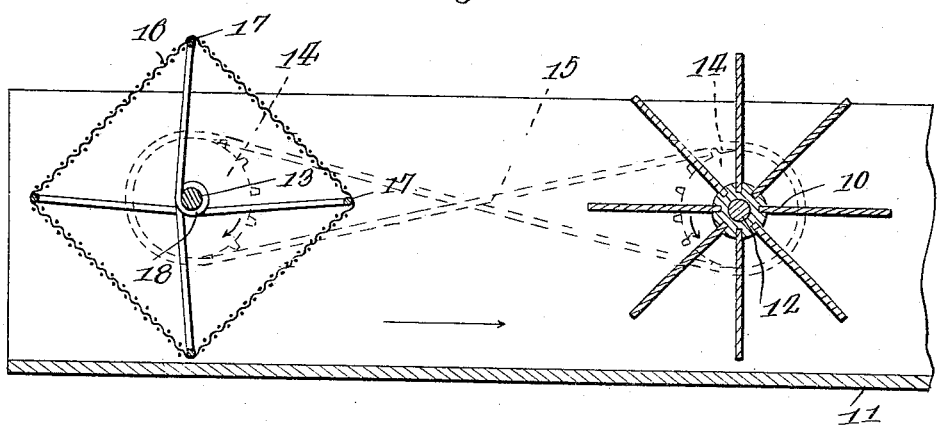
Figure 2:
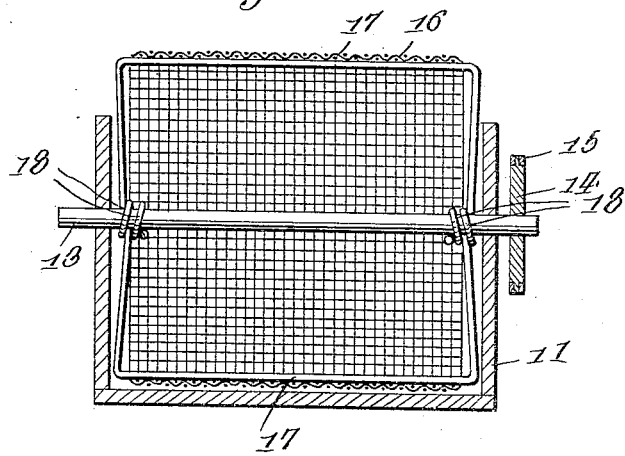

Figure 1 is a view showing the improved fish screen in longitudinal vertical section. Fig. 2 is a transverse vertical section taken through the screen drum of Fig. 1.

The paddle wheel 10 is rotatably mounted in the trough 11 and has its shaft 12 extending beyond one of the side walls of the trough. It will thus be seen that the water flowing through the trough will rotate the paddle wheel and that therefore this paddle wheel will constitute driving means for the drum. The drum is also rotatably mounted in the trough as shown in Fig. 1 and is provided with a shaft 13 rotatably mounted in openings formed in the walls of the trough and extending beyond the outer faces thereof. The shafts 12 and 13 carry a sprocket wheel 14 around which the sprocket chain 15 passes so that the rotary motion of the driving means or paddle wheels may be transmitted to the drum. The screen 16 is held in spaced relation to the shaft 13 by means of the spoke structures 17, each of which is rectangular in shape and provided with eyes 18 through which the shaft 13 passes. These spoke structures are formed of resilient wire and therefore the spokes will have a binding engagement with the screen thus holding the screen very tight and preventing any tendency of the screen to slip or get out of shape. It should be further noted that by having the spokes formed of resilient material the eyes form spring elements for the spokes as well as providing means for rigidly connecting the spokes with the shaft 13.

When this fish screen is in use it is mounted in the trough as shown in Fig. 1 and as the water passes through the trough it will rotate the paddle wheel. The rotary motion of the paddle wheel will be transmitted to the drum through the medium of the sprocket chain 15 and the drum will thus be caused to rotate in the trough. Therefore the water will be permitted to flow through the trough but fish will be prevented from passing through the trough.

What is claimed is:—

1. A fish screen comprising a trough, a rotatable shaft extending through said trough, spoke elements rigidly connected with said shaft, each of said spoke elements being rectangular in shape and formed of resilient material, the side arms of the spoke elements being bent to provide eyes through which said shaft passes and constituting spring elements for the spokes, and a screen extending about said spoke elements and bending the spoke elements whereby the tendency of the spoke elements to return to their original position will create a binding action between the spoke elements and the screen.

2. A fish screen comprising a trough, a shaft rotatably supported from the walls of said trough, spoke elements extending from said shaft and formed of resilient wire, said spoke elements being provided with arms bent to provide eyes constituting spring elements through which said shaft passes to rigidly connect the spoke elements with the shaft, a screening extending about said spoke elements and bending the spoke elements at the eyes to cause a binding action between the spoke elements and the screening, and means for rotating said shaft.

In testimony whereof I affix my signature in presence of two witnesses.

WILLIAM A. HOGE.

Witnesses:
 FRED KIPP,
 CHARLES HEYL.

Copies of this patent may be obtained for five cents each, by addressing the "Commissioner of Patents, Washington, D. C."